US009575480B1

(12) United States Patent
 Azarchs et al.

(10) Patent No.: US 9,575,480 B1
(45) Date of Patent: Feb. 21, 2017

(54) SOLUTION STABILIZATION FOR LINEAR PROGRAM-BASED CONTROL SYSTEMS

(71) Applicant: eSolar Inc., Burbank, CA (US)

(72) Inventors: Adam Azarchs, Paris (FR); Matthew Hartshorn, Los Angeles, CA (US)

( * ) Notice: Subject to any disclaimer, the term of this patent is extended or adjusted under 35 U.S.C. 154(b) by 483 days.

(21) Appl. No.: 14/137,739

(22) Filed: Dec. 20, 2013

Related U.S. Application Data

(60) Provisional application No. 61/745,478, filed on Dec. 21, 2012.

(51) Int. Cl.
 *G05B 15/02* (2006.01)
 *F24J 2/38* (2014.01)

(52) U.S. Cl.
 CPC . *G05B 15/02* (2013.01); *F24J 2/38* (2013.01)

(58) Field of Classification Search
 None
 See application file for complete search history.

(56) References Cited

U.S. PATENT DOCUMENTS

| 2006/0276938 | A1* | 12/2006 | Miller | G06Q 50/06 700/295 |
| 2009/0062969 | A1* | 3/2009 | Chandra | G06Q 10/06 700/291 |
| 2009/0217921 | A1* | 9/2009 | Gilon | F03G 6/06 126/600 |
| 2011/0036343 | A1* | 2/2011 | Kroyzer | F24J 2/07 126/574 |
| 2012/0072040 | A1* | 3/2012 | Kaji | H02J 3/14 700/291 |

OTHER PUBLICATIONS

Luis Rademacher, "Approximating the Centroid is Hard," Proceedings of the twenty-third annual symposium on Computational geometry 2007, pp. 302-305, Jun. 6-8, 2007.*
J. L. Prince and A. S. Willsky, "Reconstructing convex sets from support line measurements," in IEEE Transactions on Pattern Analysis and Machine Intelligence, vol. 12, No. 4, pp. 377-389, Apr. 1990.*

* cited by examiner

*Primary Examiner* — Christopher E Everett
(74) *Attorney, Agent, or Firm* — Brooks Acordia IP Law, P.C.; Pejman Yedidsion

(57) ABSTRACT

Methods, systems, and devices for choosing a point from a set of optimal solutions defined as the output of a problem in such a way that small perturbations to the input variables of the problem may reliably produce small changes to the output. Embodiments may determine the optimal point for concentrating solar thermal power plants utilizing heliostats, based on a linear function, one or more constraints, and a determined space of optimal solutions.

9 Claims, 12 Drawing Sheets

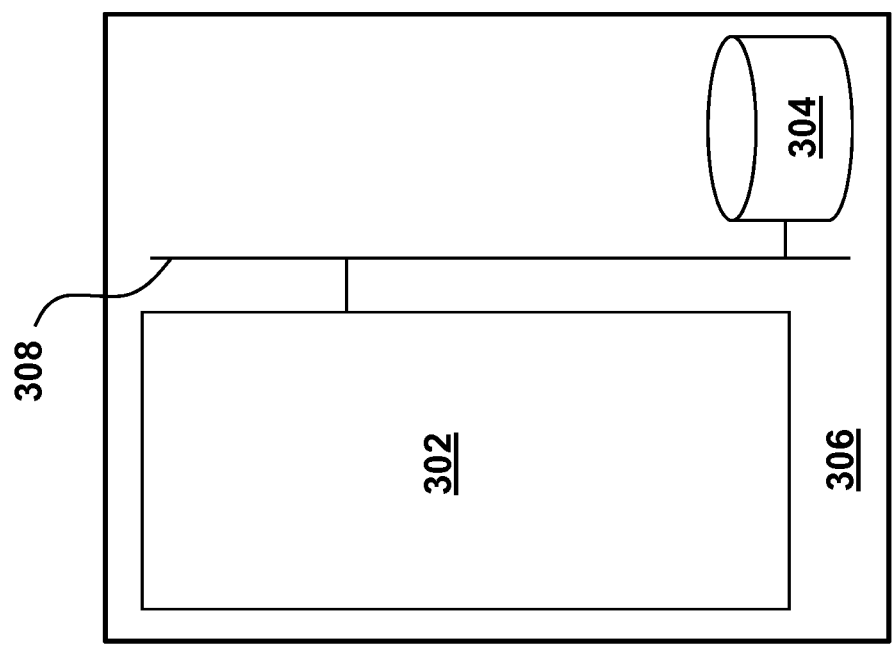

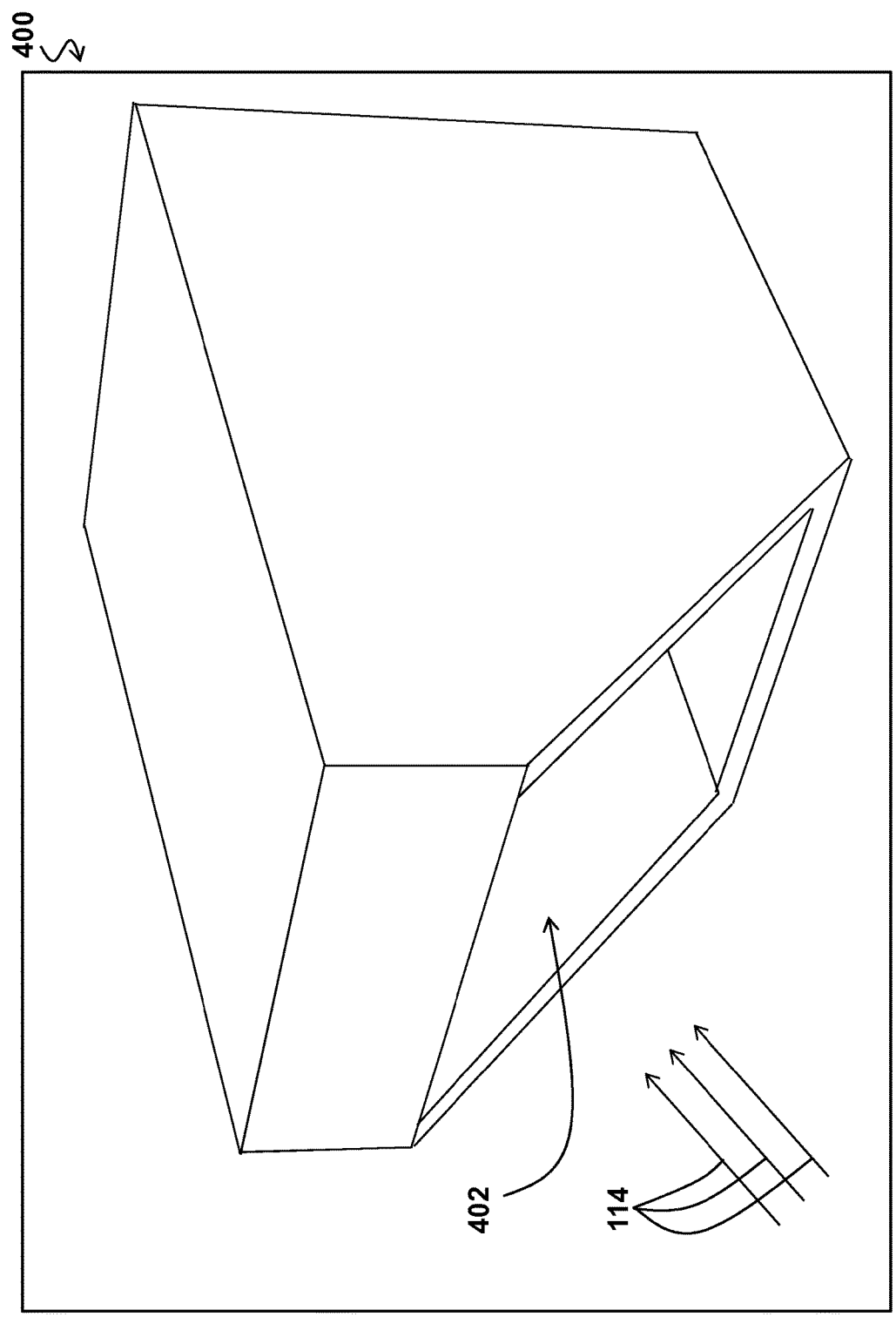

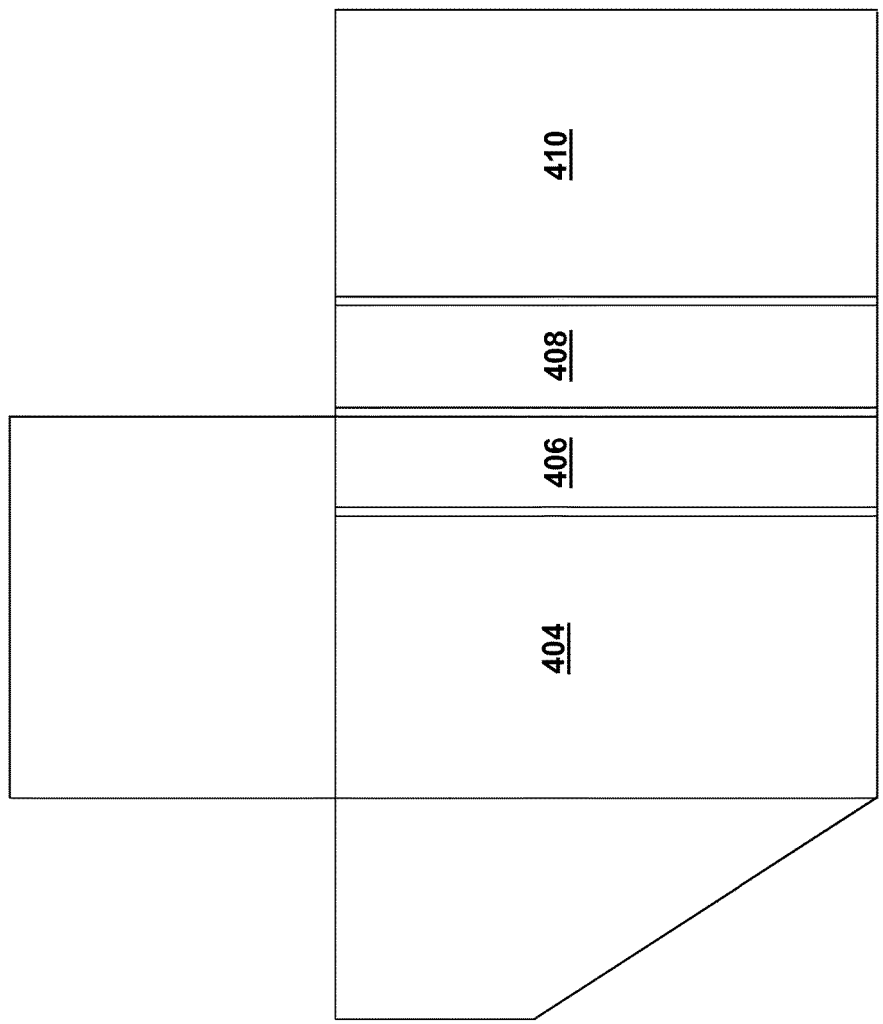

SOLUTION STABILIZATION FOR LINEAR PROGRAM-BASED CONTROL SYSTEMS

CROSS-REFERENCE TO RELATED APPLICATIONS

This application claims priority to and the benefit of U.S. Provisional Patent Application Ser. No. 61/745,478, filed Dec. 21, 2012, which is hereby incorporated herein by reference in its entirety for all purposes.

FIELD OF ENDEAVOR

The invention relates to the field of concentrating solar thermal power and more particularly, to methods, devices, and systems for stabilizing linear program based control systems.

BACKGROUND

Concentrating solar thermal power plants utilize heliostats to redirect flux from the Sun onto a solar thermal receiver. The solar thermal receiver may require varying levels of flux as determined by a processor utilizing a linear program optimizer. Linear program optimizers with non-unique optimal solutions may be very sensitive to input conditions in terms of which optimal solution they output. If the output is used in a control system, and the inputs fluctuate in time, this may result in undesirable behavior for the solar thermal power plant.

SUMMARY

An exemplary system embodiment may include a processor having an addressable memory, the processor configured to: receive a linear function comprising one or more input parameters; receive one or more constraints associated with the received linear function; determine a full space of optimal solutions to the received linear function based on the one or more input parameters and the one or more constraints; select a point from inside the full space of optimal solutions as a return variable, wherein small perturbations to the received one or more input parameters produces small changes to the return variable.

Additionally, in one embodiment the full space of optimal solutions may be a convex shape and the selected point may be a centroid of the full space of optimal solutions where the selected point may be an average position of a set of vertices of the convex shape. In one embodiment, the one or more constraints may comprise a limit on a calculated total energy that a heat source can contribute to the system. In another embodiment, the one or more constraints may comprise a total amount of flux a receiver can absorb where the one or more constraints may comprise the total amount of flux a panel of the receiver can absorb. In another embodiment, the one or more input parameters may comprise maximizing an amount of heat absorbed by the system. Optionally, the determined full space of optimal solutions to the received linear function may be determined by a simplex algorithm.

Exemplary embodiments may include a method comprising: receiving, by a processor having an addressable memory, a linear function comprising one or more input parameters; receiving, by the processor, one or more constraints associated with the received linear function; determining, by the processor, a full space of optimal solutions to the received linear function based on the one or more input parameters and the one or more constraints; and selecting, by the processor, a point from inside the full space of optimal solutions as a return variable, wherein small perturbations to the received one or more input parameters produces small changes to the return variable. In one embodiment the full space of optimal solutions may be a convex shape where the selected point may be a centroid of the full space of optimal solutions and the selected point an average position of a set of vertices of the convex shape. In another embodiment, the one or more constraints may comprise a limit on a calculated total energy that a heat source can contribute to the system. Additionally, the one or more constraints may comprise: a total amount of flux a receiver can absorb and the total amount of flux a panel of the receiver can absorb. In one embodiment, the one or more input parameters may comprise maximizing an amount of heat absorbed by the system and optionally, the determined full space of optimal solutions to the received linear function may be determined by a simplex algorithm.

BRIEF DESCRIPTION OF DRAWINGS

Embodiments are illustrated by way of example and not limitation in the figures of the accompanying drawings, in which:

FIG. 3 depicts an exemplary control processing unit for stabilizing the output of a linear program;

FIG. 4A depicts an exemplary cavity central receiver;

FIG. 4B depicts an exemplary cavity central receiver with flattened internal surfaces;

DETAILED DESCRIPTION

Figure 1:
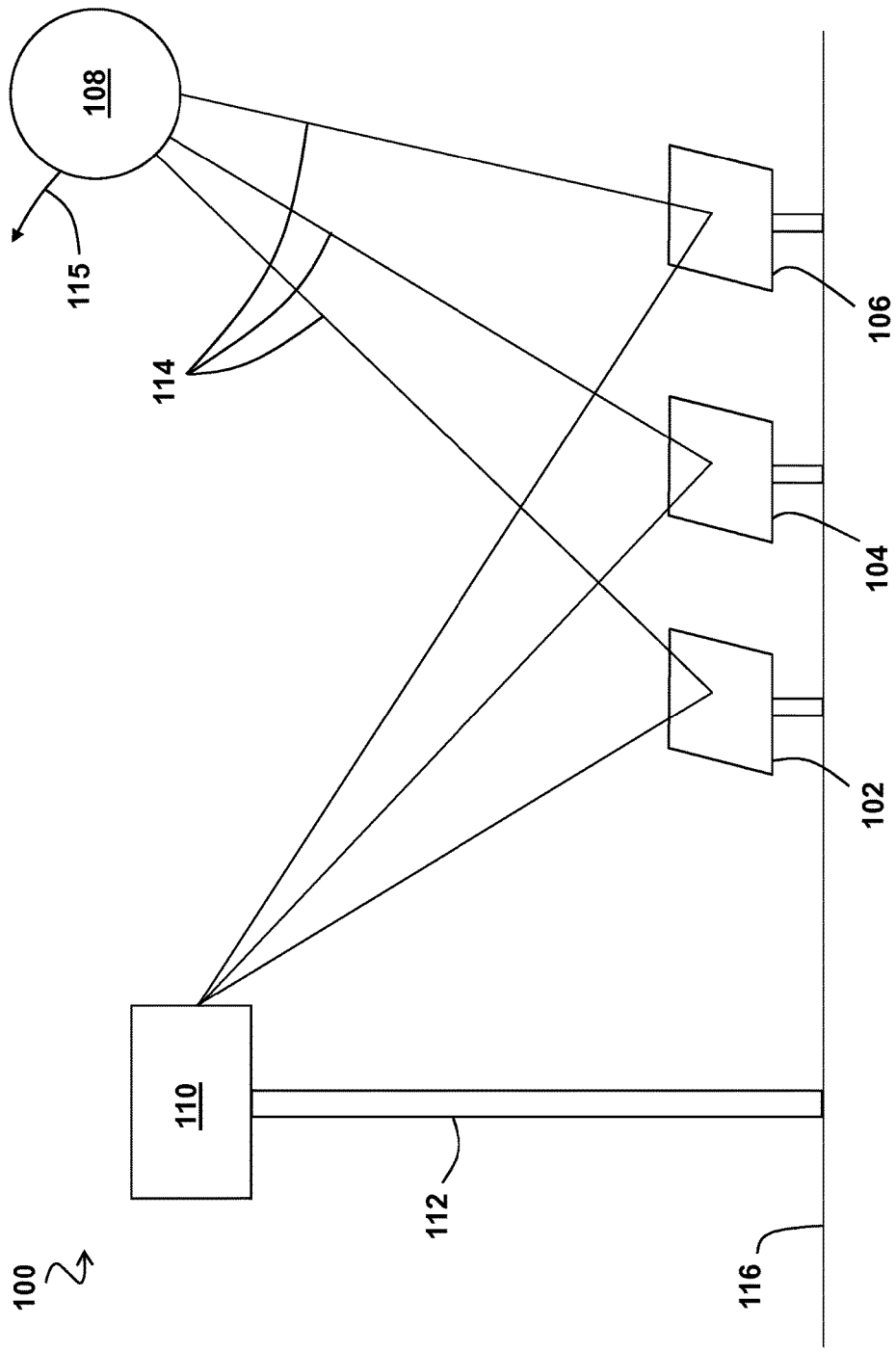
FIG. 1 depicts an exemplary solar thermal receiver solar plant.

FIG. 1 depicts an exemplary solar thermal receiver solar plant 100. The plant may comprise one or more ground-mounted heliostats 102,104,106. These one or more heliostats 102,104,106 may be grouped into one or more heliostat arrays (see FIG. 2). The heliostats 102,104,106 may be configured to reflect flux 114 from the Sun 108 toward a solar thermal receiver 110. The solar thermal receiver 110 may be mounted on a tower 112 at an elevated position such that the heliostats 102,104,106 may have a clear field of view to reflect flux 114 toward the solar thermal receiver 110. As the Sun 108 changes position 115 in the sky relative to the ground 116 throughout the day, the heliostats 102,104,106 may change position in order to continue reflecting incident flux 114 from the Sun 108 onto the solar thermal receiver 110.

Figure 2:
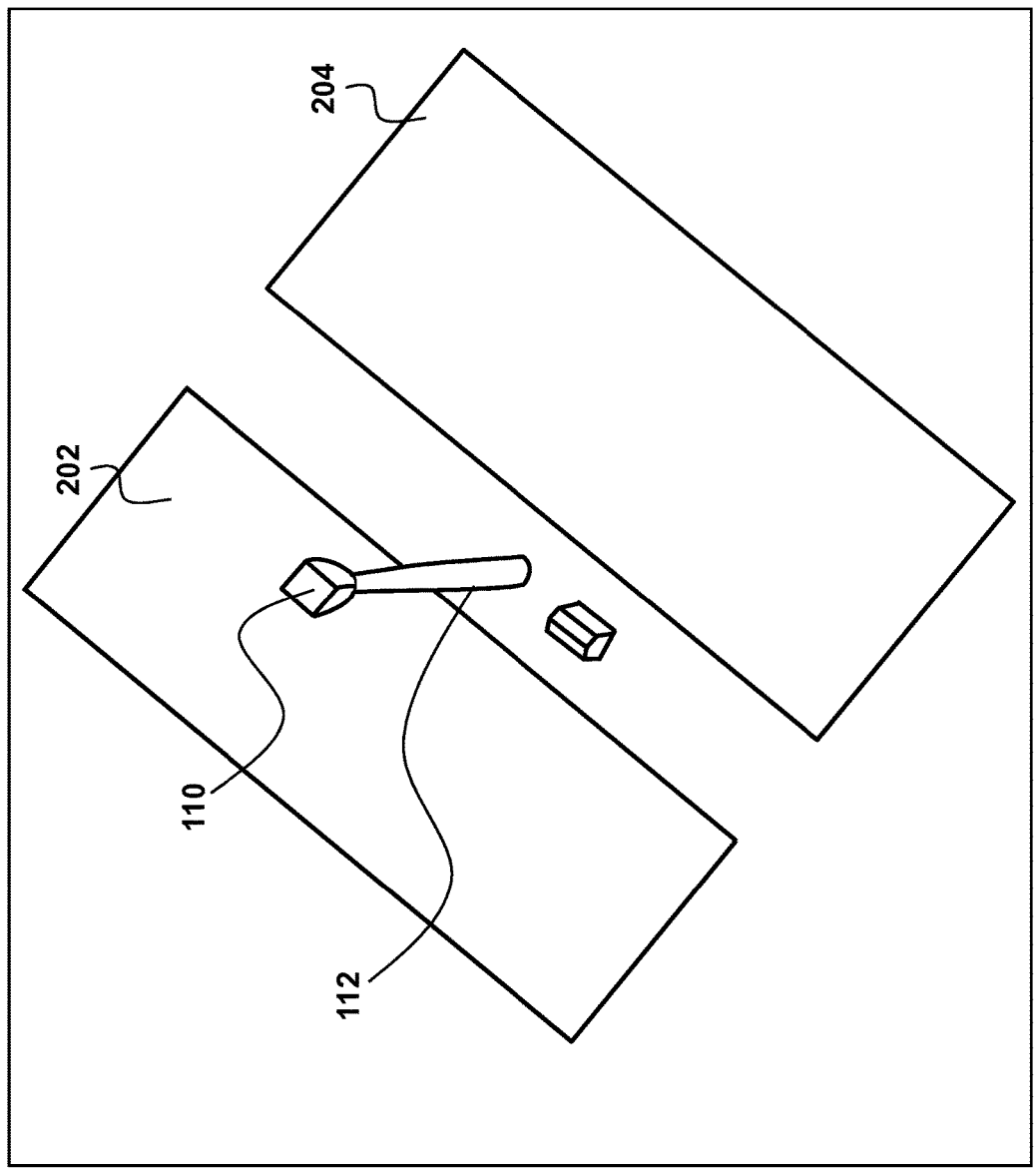
FIG. 2 depicts a perspective view of an exemplary solar thermal receiver positioned between two heliostat arrays.

FIG. 2 depicts a perspective view of an exemplary solar thermal receiver 110 positioned between two heliostat arrays 202,204. The solar thermal receiver 110 may be positioned between a first heliostat array 202 and a second heliostat array 204. An exemplary solar plant may comprise one or more solar thermal receivers 110. Each solar thermal receiver 110 may be mounted on a tower 112 and receive reflected incident Sunlight from one or more corresponding heliostat arrays 202,204.

FIG. 3 depicts an exemplary control processing unit 300 for stabilizing the output of a linear program. The system may comprise one or more control processing units 306 having a processor 302 and memory 304 addressable with a data bus 308 to execute the linear program or a linear function where the linear function may be the part of the linear program to be solved in order to achieve the best outcome. Accordingly, the control processing unit 300 may control a single heliostat or a group of heliostats. The control processing unit 300 may be configured to generate individual and/or group-wise optimal orientation commands to one or more heliostat servos of the one or more heliostat arrays. The one or more processing units 306 may be used to determine stable outputs of linear program based control systems.

FIG. 4A depicts an exemplary cavity central receiver 400. Energy absorption, e.g., heat absorption, in the cavity central receivers 400 may occur internally as flux 114 is directed through an opening 402. The heat absorbing portion of the cavity central receiver 400 may be subdivided into one or more portions (see FIG. 4B).

FIG. 4B depicts an exemplary cavity central receiver with flattened internal surfaces 401. The cavity central receiver may be subdivided into one or more panels. The exemplary cavity central receiver may comprise a first internal panel 404, a second internal panel 406, a third internal panel 408, and a fourth internal panel 410. The panels 404,406,408,410 may comprise abutted pipes carrying a heat transfer fluid, e.g., water, a photovoltaic surface, or other materials, and/or solids, e.g., cerium oxide. The material of the panels 404, 406,408,410 may be any light and/or heat absorbing material. The panels 404,406,408,410 may be chosen such that the power limit on each panel is controlled uniformly. Thus, the power limit on each of the panels 404,406,408,410 may be uniform across the panel.

Figure 5:
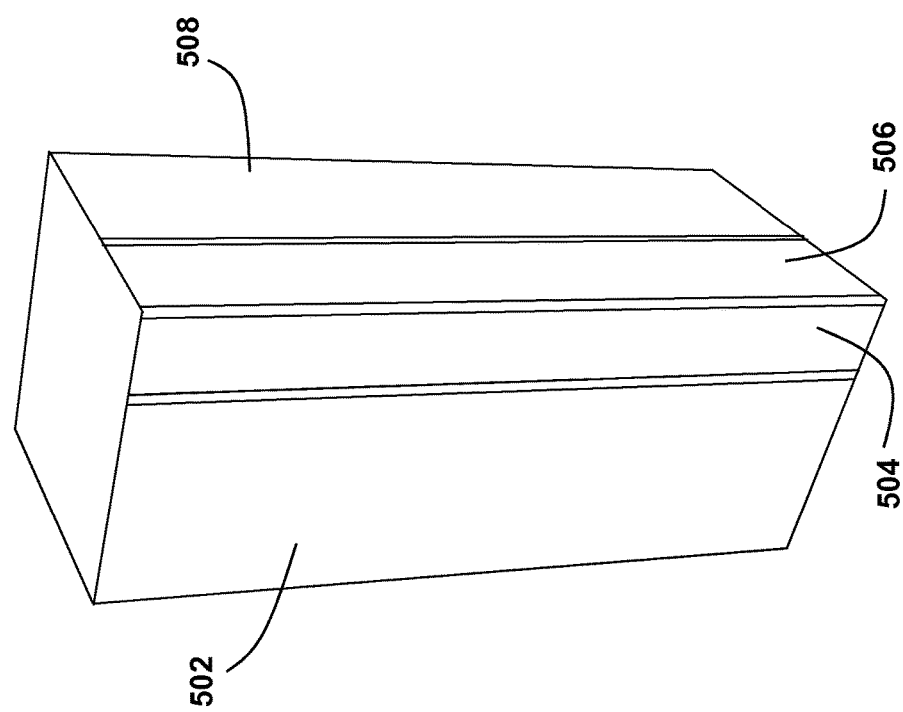
FIG. 5 depicts an exemplary external central receiver.

FIG. 5 depicts an exemplary external central receiver 500. The central receiver 500 may comprise four external panels in a four-panel subdivision. A first external panel 502, a second external panel 504, a third external panel 506, and a fourth external panel 508 may comprise abutted pipes carrying a heat transfer fluid, e.g., water, a photovoltaic surface, or other materials and/or solids, e.g., cerium oxide. One or more thermo-mechanical design considerations may specify a limit of power, i.e., the area integral of flux, which may fall safely on each of the panels 502,504,506,508. The amount of power needed for the plant may be determined by a high-level plant operational controller. This controller may then request this determined amount of power by sending an aiming command to one or more heliostats of the one or more heliostat arrays. This may result in an increase or decrease in power being reflected from the heliostats onto the central receiver 500. A linear program-based control system, controlled by a processing unit (See FIG. 3), may stabilize outputs to prevent large increases and/or decreases in this power being reflected from the heliostats onto the central receiver.

Figure 6:
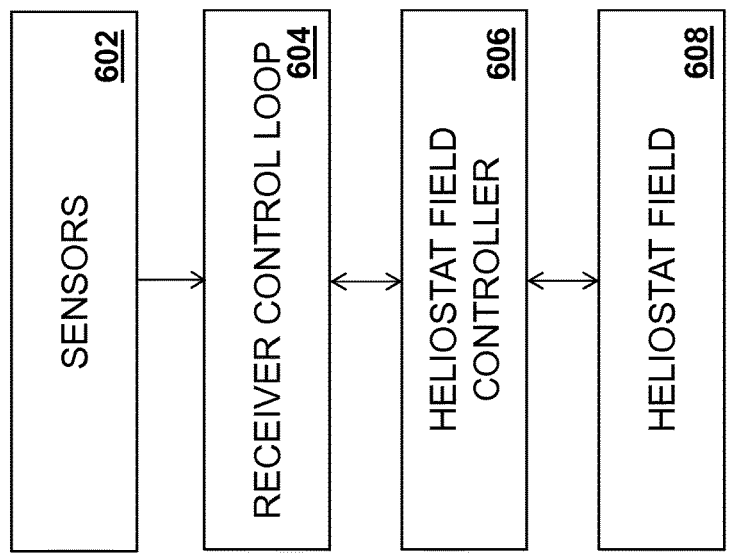
FIG. 6 depicts an exemplary data flow architecture.

FIG. 6 depicts an exemplary data flow architecture 600. The power requested by a controller may vary during the operation of the plant. During start-up and/or shutdown of the plant, the requested power may be less than the maximum power possible to be delivered. During a running operation, once the plant has gone through start-up and before shut-down, the requested power may be equal to or less than the maximum power possible to be delivered. A Heliostat Field Controller 606 may be configured to send commands to a heliostat field 608 and receive feedback from the heliostat field 608. The Heliostat Field Controller 606 may also be configured to generate configuration commands to individual heliostats in the heliostat field 608. The Heliostat Field Controller 606 may generate a command to direct one or more heliostats to reflect Sunlight toward a given point, where the normal of the heliostat is the bisector of the Sun and the target direction. The Heliostat Field Controller 606 may take in measurements from one or more sensors 602. These measurements may be direct and/or indirect, and may be local working fluid temperatures and/or state information pertaining to the group and/or individual receivers. In some embodiments, the control inputs and/or output functions of the Heliostat Field Controller 606 may be distributed to two or more controllers. The Heliostat Field Controller 606 may receive one or more power allocation commands from a Receiver Control Process in a Receiver Control Loop 604. These power allocation commands may include instructions on how to allocate the available reflected power to each receiver panel (see FIGS. 4A-4B). The Receiver Control Process may formulate a power allocation based on operational conditions and/or input from sensors 602. The sensors 602 may be configured to measure, for example, a temperature of the receiver, a temperature of the piping, a pressure in the receiver, a pressure in the piping, and others. The Receiver Control Process power allocation may seek to maintain steam conditions and/or prevent the overheating of parts of the receiver. The system may translate per-power heliostat panel power requirements specified by the Receiver Control Loop 604 into specific heliostat field 608 aiming strategies. These heliostat field 608 aiming strategies may be stabilized by a linear program-based control system, controlled by one or more control processing units (See FIG. 3), to avoid sudden fluctuations in per-panel heliostat panel power requirements.

Figure 7:
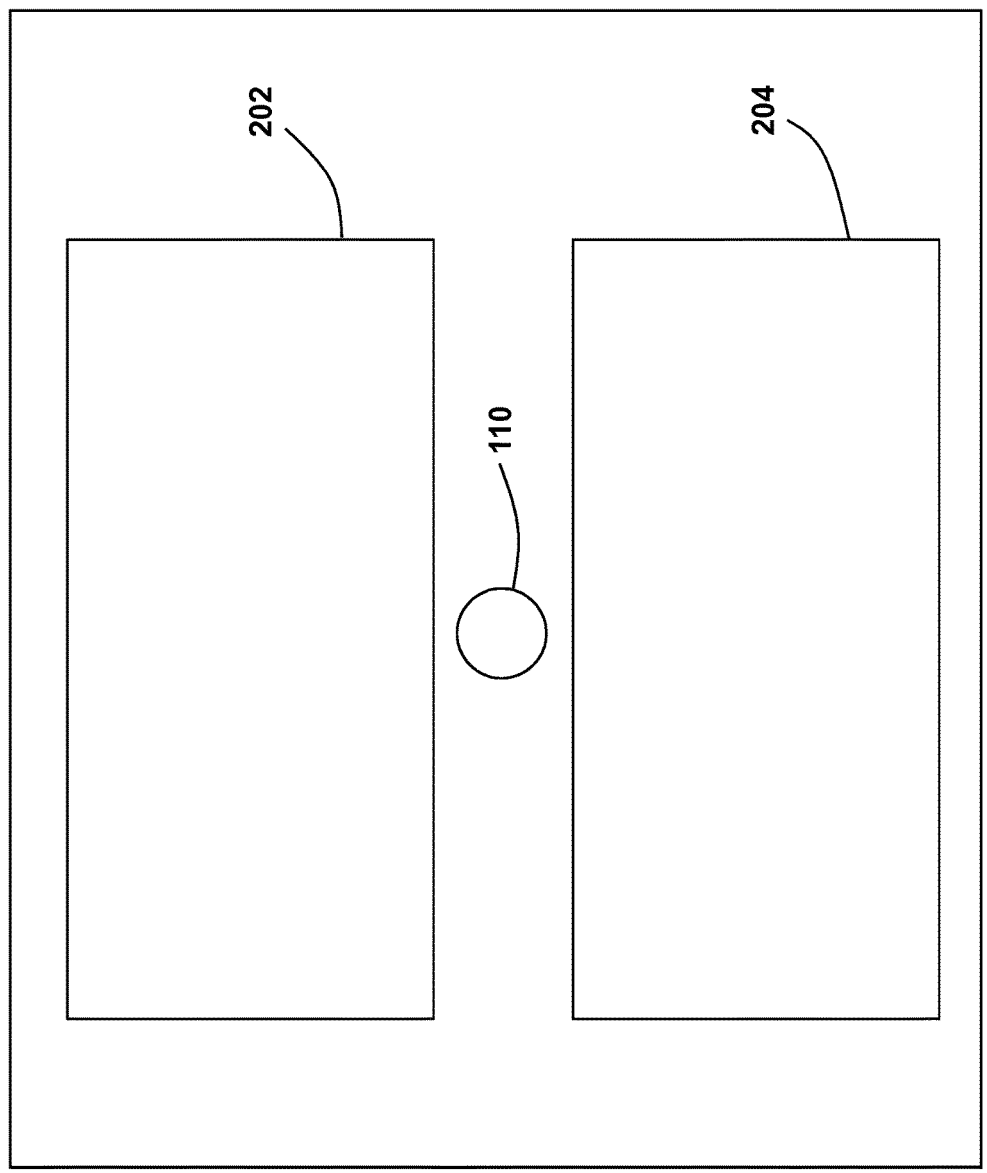
FIG. 7 depicts a top view of an exemplary heliostat field layout with a central receiver positioned between two heliostat arrays.

FIG. 7 depicts a top view of an exemplary heliostat field layout with a central receiver 110 positioned between a first heliostat array 202 and a second heliostat array 204. Each heliostat array 202,204 may consist of two or more rows of heliostats arranged in a rectangular, or other polygonal, shape. The first heliostat array 202 may be positioned north of the central receiver 110 and the second heliostat array 204 may be positioned south of the central receiver 110.

Figure 8:
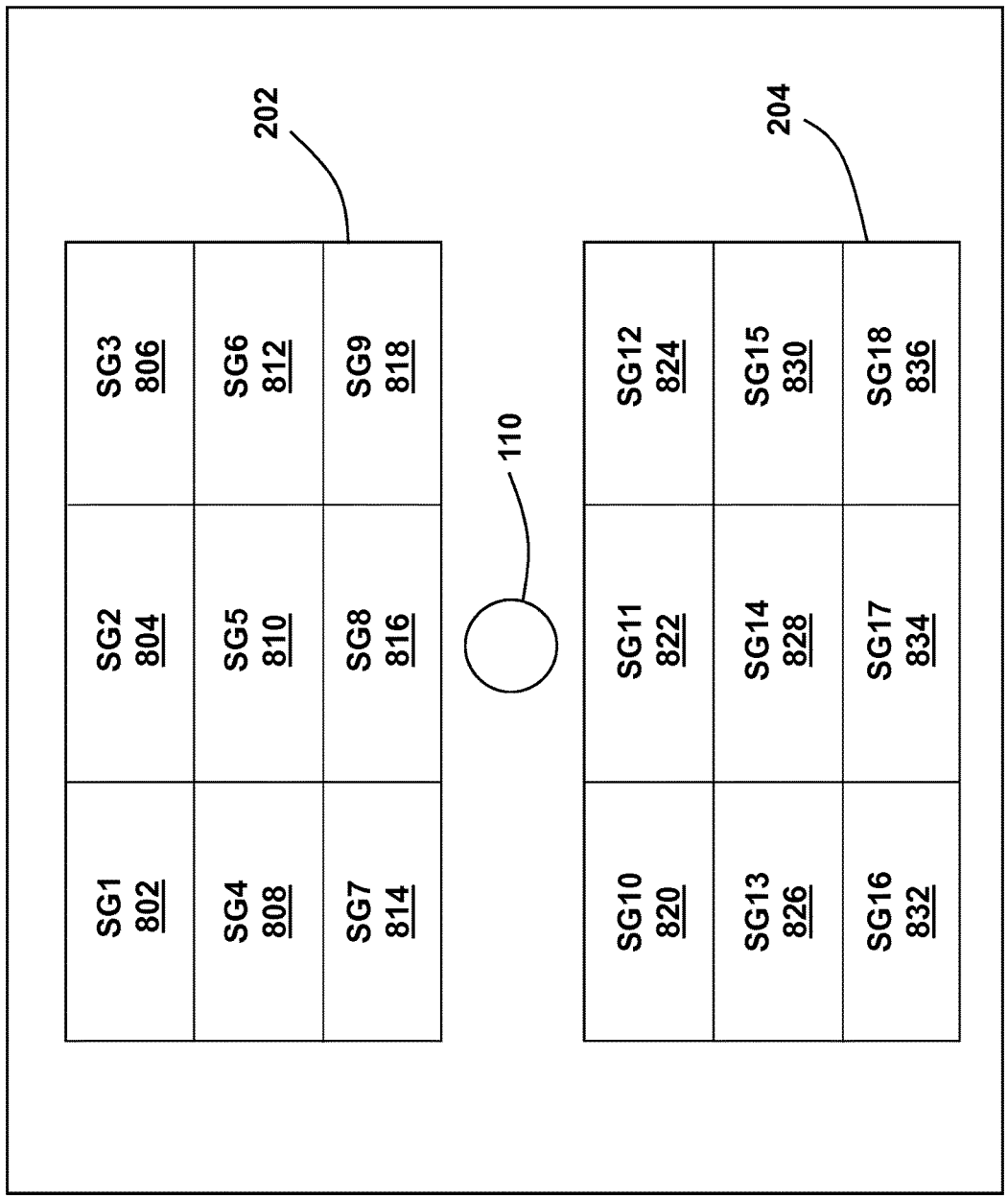
FIG. 8 depicts the exemplary heliostat field layout of FIG. 7 with the two heliostat arrays divided into subgroups.

FIG. 8 depicts the exemplary heliostat field layout of FIG. 7 with the two heliostat arrays 202,204 divided into subgroups. The first heliostat array 202 may be divided into two or more subgroups. In this exemplary embodiment, each heliostat array 202,204 may be divided into a grid of nine subfields. The first heliostat array 202 may comprise the subgroups SG1 802, SG2 804, SG3 806, SG4 808, SG5 810, SG6 812, SG7 814, SG8 816, and SG9 818. The second heliostat array 204 may comprise the subgroups SG10 820, SG11 822, SG12 824, SG13 826, SG14 828, SG15 830, SG16 832, SG17 834, and SG18 836.

Figure 9:
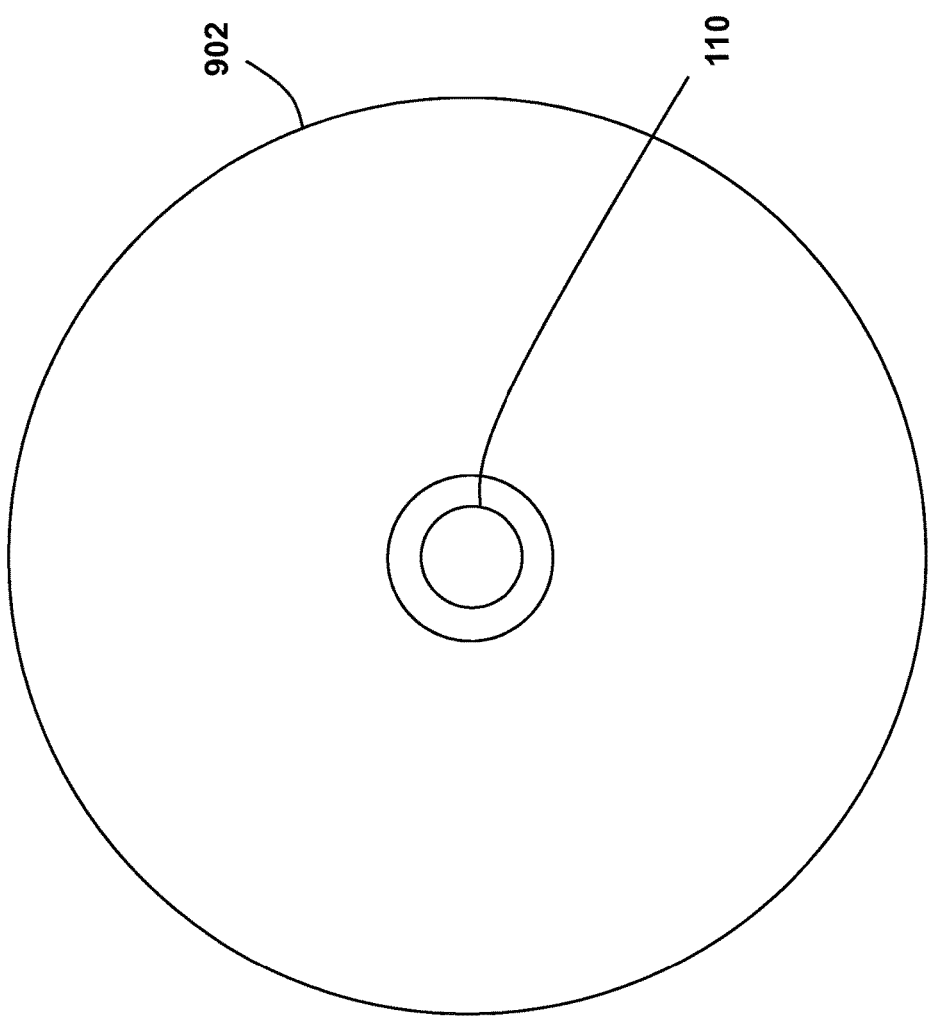
FIG. 9 depicts an exemplary circular heliostat field layout with a central receiver positioned in the center of the heliostat field.

FIG. 9 depicts an exemplary circular heliostat field layout with a central receiver 110 positioned in the center of the circular heliostat field 902.

Figure 10:
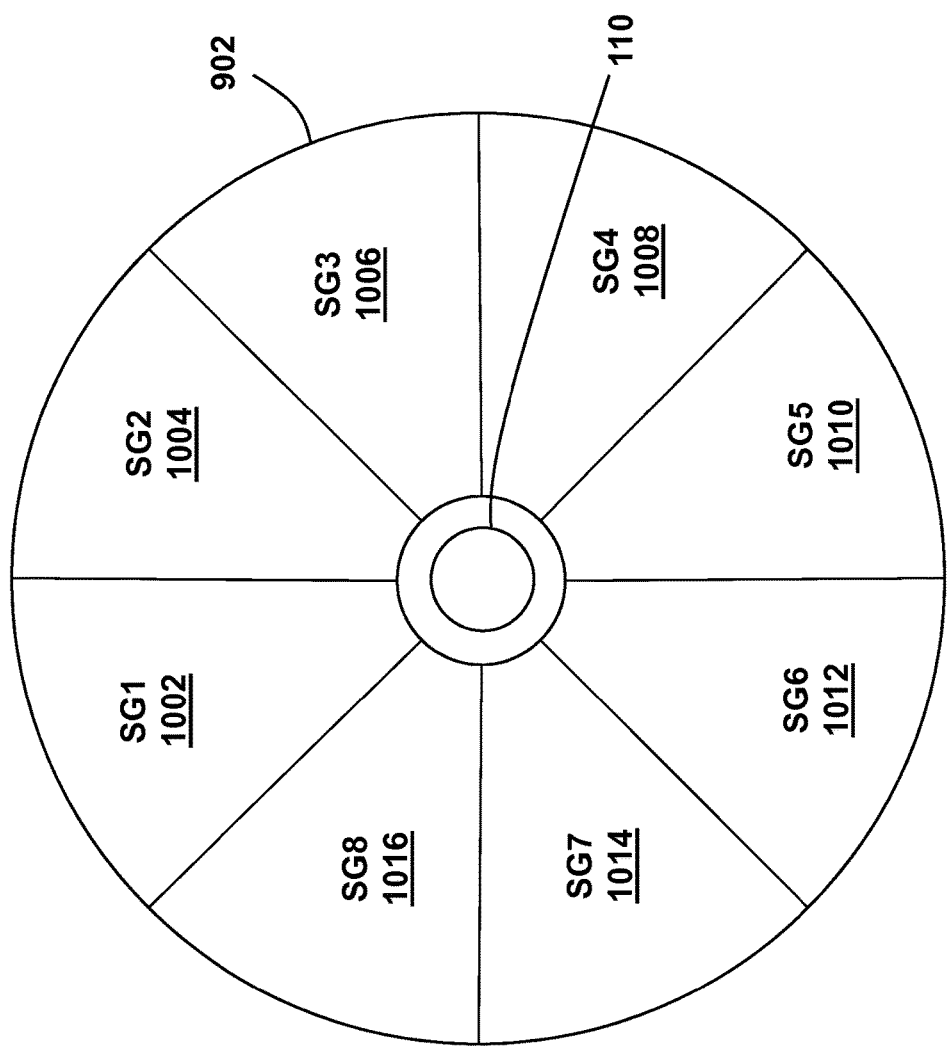
FIG. 10 depicts an exemplary circular heliostat field layout with a central receiver positioned in the center of the heliostat field divided into subgroups.

FIG. 10 depicts an exemplary circular heliostat field layout with a central receiver 110 positioned in the center of the circular heliostat field 902 divided into subgroups. The circular heliostat field 902 may be radially-symmetric and comprise two or more subgroups. The heliostat field 902 may comprise the radially-defined subgroups SG1 1002, SG2 1004, SG3 1006, SG4 1008, SG5 1010, SG6 1012, SG7 1014, and SG8 1016. In some embodiments, the heliostat field 902 may be divided into subgroups so as to maximize differences between the Subgroup to Panel Contribution table (SPC) for each subgroup.

Figure 11:
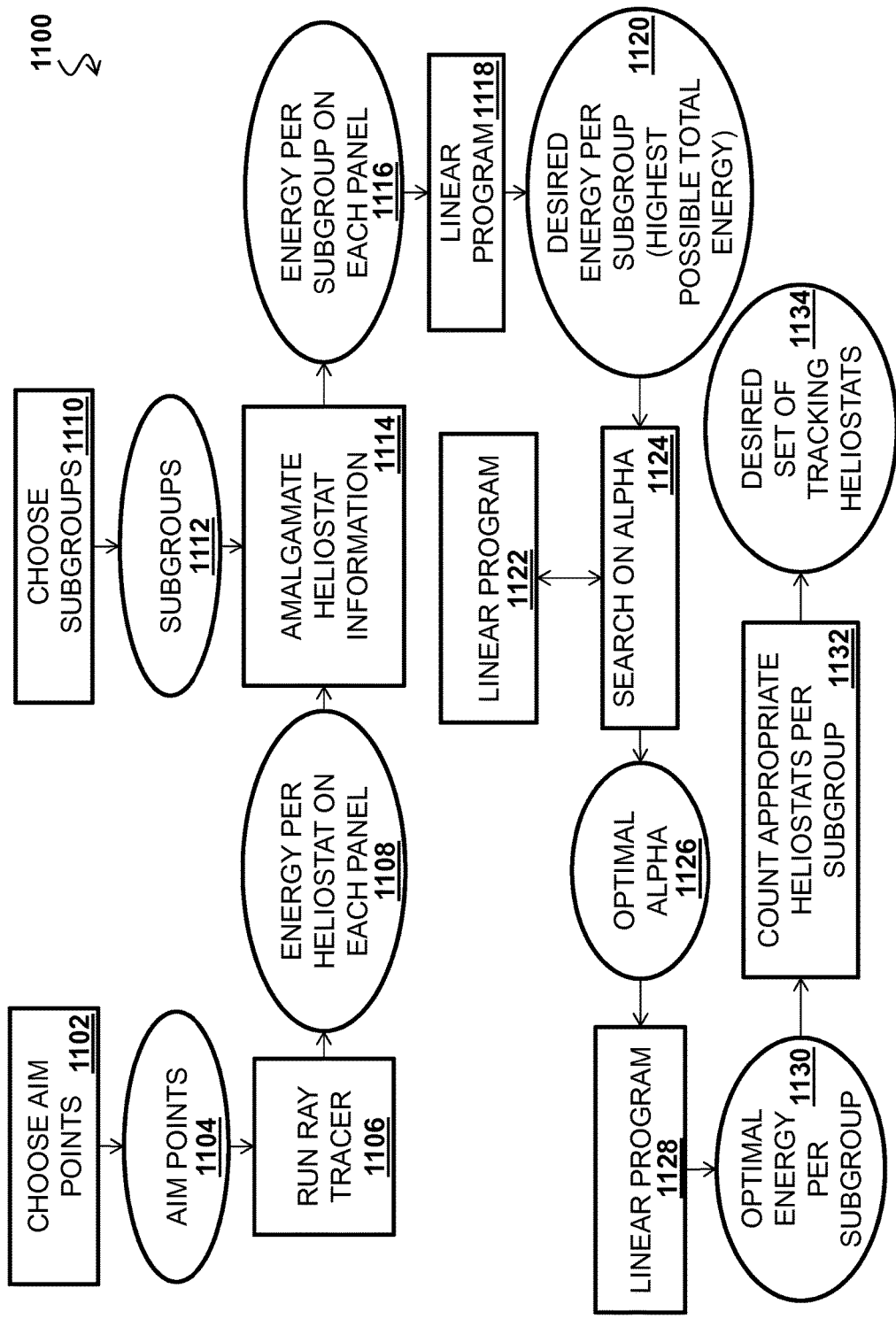
FIG. 11 depicts a flowchart of an exemplary system for positioning heliostats to maximize power on a central receiver given certain constraints.

FIG. 11 depicts a flowchart of an exemplary system for positioning heliostats to maximize power on a central receiver given certain constraints 1100. This sequence may be executed by a processor having addressable memory. First, the processor may choose one or more aim points 1102 on a central receiver. Then, the processor may calculate heliostat location pointing data for those aim points 1104. A ray trace may be executed 1106 to calculate the energy per heliostat on each panel 1108. Heliostat subgroups may then be chosen 1110 by, for example, existing programming in the processor and/or a user selection of subgroups. Amalgamated heliostat information 1114 may be created by combining the result of the run ray tracer 1106 and the selected subgroups 1112. In some embodiments, the creation of amalgamated heliostat information 1114 may be on a shorter timescale than the running of ray tracing. For example, the choice of aim points 1102 and the selection of subgroups 1110 may occur only once at commissioning time, or it may occur during a daily or yearly update. Then, the ray tracer may be run in short intervals, for example, approximately five minute intervals, while the amalgamated heliostat information 1114 may be created approximately every five seconds. The time intervals between the ray tracer and amalgamated heliostat information may be tailored to site demands, and may be modified to be updated anywhere from fractions of a second to hours. The amalgamated heliostat information process 1114 may be used to determine the energy per subgroup on each panel 1116 of the central receiver. The processor may then run a linear program 1118 to determine the desired energy per subgroup 1120, which will return the highest possible total energy on the central receiver. This desired energy per subgroup may be designated by alpha. The processor may run a search program to find an optimal value of alpha 1124. The search program may comprise a linear program 1122, a linear walk, a binary search, a heuristic optimization, or any other search method to identify desired values. Once the search program finds an optimal alpha 1126, the processor may run a linear program 1128 to calculate the optimal energy per subgroup 1130. The processor may then determine a count of the appropriate number of heliostats per subgroup to be designated 1132. The processor may then select a desired set of tracking heliostats 1134 that satisfies the determined count of appropriate heliostats per subgroup 1132.

The search program may have the goal of providing an equal number of subgroups and/or an equal amount of energy spread across the central receiver. Providing subgroups of similar size may help to minimize the total number of heliostats that need to move in the heliostat field each time a field adjustment occurs. Minimizing movements may reduce maintenance costs and/or increase heliostat lifetime. Alternatively, minimizing the variation across a receiver may help to minimize thermal cycling, which increases receiver lifetime. The linear program solution may be stabilized, by one or more control processing units (See FIG. 3) as described in the present disclosure, to ensure that large movements are minimized to avoid stresses on the plant equipment.

The power output of a subgroup may be increased by pointing a larger fraction of the subgroup's heliostats at the central receiver. The power output of the subgroup may be decreased by pointing a smaller fraction of the subgroup's heliostats at the central receiver. In some embodiments, each heliostat field may be divided into subgroups in an arbitrary fashion. In other embodiments, each heliostat field may be divided into subgroups in order to maximize control and stability of the flux distribution on the central receiver. These distributions may be based on geographical constraints.

In an exemplary embodiment, power output may be estimated for each subgroup by a controller, e.g., the control processing unit of FIG. 3. Additionally, the controller may be configured to determine the power output of a subgroup based on at least one of: the positions of the heliostats in the subgroup, the geometry of the heliostats in the subgroup, the position of the central receiver, the geometry of the panels of the central receiver, the number of heliostats pointed at the central receiver, the position of the Sun, and the Direct Normal Insolation. The controller may also ensure that the power level on each panel of the receiver does not exceed a set limit. The limits on the power levels may be based on variables set by a user.

Once the power output of a subgroup is estimated, the controller may determine the power level desired from each subgroup, such that the power level requested on the receiver is achieved. The controller may further request that the subgroup provide this desired level of power. The controller may achieve this by determining the optimal amount of heliostats to point at the receiver such that a desired power level on the receiver is attained. The controller may also ensure that the power level on each of the panels of the central receiver does not exceed a set limit.

Linear Program Simple Procedure (LPSP)

Determining the power level desired from each subgroup, such that the power level on the central receiver may be met without exceeding the set limits of the central receiver panels, may be achieved by an exemplary controller in two exemplary steps. First, a table comprising the relative amount of power that each subgroup provides to each panel of the central receiver may be calculated. This table may be the Subgroup to Panel Contribution table (SPC), which may be a matrix representing the power that each subgroup delivers to each panel. In some embodiments, the SPC may be pre-computed. In other embodiments, the SPC may be dynamically updated as needed.

The SPC may be calculated in conjunction with a heliostat group aiming strategy. The heliostat group aiming strategy is a process by which individual heliostats, of a heliostat subgroup, are given a particular point at which to aim based on their given aim group. Each heliostat in the subgroup may be given an aim group center. The aim group center is a point to which the heliostat field should focus flux from the Sun. In an exemplary embodiment, the aim group center may be the center of the central receiver. Each heliostat of the heliostat subgroup may be assigned an aim point which puts light somewhere on the receiver. The information used to determine the aim points of the individual heliostats may also be used when determining the SPC used by the LPSP, and the choice of a heliostat single aim point strategy may improve both the stability of those tables and the flux uniformity on the receiver.

When a heliostat reflects flux to a given aim point, the amount of power the heliostat delivers to each panel of the central receiver may be estimated at any point in time, e.g., via ray tracing. The fraction of power that a heliostat contributes to a given panel may be close to constant with time due to at least two effects: first, the center of the image varies only with the geometry of the field layout, the geometry of the central receiver, and aim point choice; and second, the heliostat's image on the target may be roughly circular. All heliostats in the same subgroup may be physically close to each other in space, and as such, they may have similar geometry with respect to the receiver.

The SPC depends on the relative geometry of the field, the relative geometry of the receiver, and—to a lesser extent—on the Sun position. As such, the SPC may only need to be calculated once, and reused at any time that the SPC may be needed in the future. If a higher degree of accuracy is needed, or desired, one or more versions of the SPC may be generated in order to incorporate the dependence on the position of the Sun. An interpolation between SPCs at similar Sun positions may be used. The SPC may then be used to calculate the amount of incident flux on each central receiver panel, given the amount of power that is being provided by each subgroup.

Therefore, given two or more heliostat groups ($SG_1$, $SG_2$ ... $SG_N$) with a known maximum power that each may deliver to the central receiver ($SG_{max1}$, $SG_{max2}$ ... $SG_{maxN}$), and given the SPC and the maxima that each panel may handle ($P_{max1}$, $P_{max2}$ ... $P_{maxM}$), the controller may determine the power level coming out of each subgroup level ($SGL_1$, $SGL_2$ ... $SGL_N$) such that a power level on the central receiver (T) may be achieved, and the power on each of the panels of the central receiver does not exceed a set limit ($P_{max1}$, $P_{max2}$ ... $P_{maxM}$). Thus, power level on the central receiver may be represented by: T=Sum(SGL) over all subgroups.

The SPC may be used in a linear program to find the optimal power requested from a given subgroup ($SGL_i$). Several limits may be considered by the program. The sum, over all subgroups, of the amount of power focused on a given panel may not exceed that panel's limit. Further, the total amount of power that each subgroup provides may be less than, or equal to, what the subgroup is capable of providing. In addition, in some embodiments the total amount of power provided by the field may not exceed the requested throttle level. The objective function of the linear program in the system is the maximized sum of the powers requested from the subgroup throttles. In some cases, this sum may already be restricted, by a previous inequality, to be less than or equal to the throttle level. In that embodiment, the system may maximize the throttle level up to the requested value, if desired. The inequalities may then be defined as:

(SPC)*(SGLi)≤($P_{maxi}$)

($SGL_i$)≤($SG_{maxi}$)

(1, 1, 1, 1 ... , 1)*($SGL_i$)≤(T)

Maximize: (1, 1, 1, 1 ... , 1)*($SGL_i$)

By combining these statements, the inequalities may be expressed in a linear programming form as:

$$\begin{pmatrix} SPC \\ \text{Identity Matrix(size of subgroup count)} \\ 1, 1, 1, 1 \ldots \ldots \ldots, 1 \end{pmatrix} * (SGL_i) \leq \begin{pmatrix} P_{maxi} \\ SG_{maxi} \\ T \end{pmatrix}$$

Objective function: (1, 1, 1, 1, ... , 1)

The system may determine this linear programming form as a result, which is a list of the heliostat subgroup levels that satisfy the given inequalities. The controller may then send a command to one or more heliostats to direct flux toward, or away from, a central receiver in order to provide the desired amount of power from their subgroup. Accordingly, using this LPSP solution, the controller honors the panel limits, and the heliostat field provides the correct throttle power level to the central receiver.

Multiple Aim Group Generalization

An LPSP solution may be used by a controller in determining how much power each subgroup should turn on and off. This solution intrinsically assumes that there may be only one aim group to which a given heliostat may point. In some embodiments, the controller may utilize a generalization to the LPSP solution to allow for two or more aim groups. In embodiments with multiple aim groups, there may be a different SPC for each aim group, which may allow for more control of the system. For example, one aim group may put more flux on a superheater, while another aim group may put that flux on an evaporator. Thus, flux may be taken off the superheater, and put on the evaporator, without reducing the total flux.

The controller may request, for a subgroup, the amount of power to point at each aim group in a given set of two or more aim groups. This request may be for the amount of power to put on a central receiver. This request may also be for the amount of heliostats in the subgroup to point off, i.e., away from, the central receiver. In some embodiments, the controller may order a subgroup to put heliostats onto a first aim point until it has filled up the requested level of the first aim point before moving onto subsequent aim points. This process assumes that the amount of power that a given heliostat may deliver, when pointing to one aim group, may be equal to the amount of power that the given heliostat may deliver when pointing to another aim group. This simplification may retain a high degree of accuracy so long as all of the two or more aim groups are not disposed far apart in angular space from each other. There may be a difference in the cosine loss of the heliostat with respect to the Sun in pointing a given heliostat at one of these two or more aim groups. As a result, the controller may manage requests for the heliostat subgroups, and, using the LPSP, the controller may calculate the maximum power allowed from a given subgroup.

If multiple aim groups are needed, or desired, then the SPC may depend on the aim group to which a given heliostat, or part of a heliostat subgroup, is pointing. As such, the controller may calculate the SPC once for each aim group ($SPC_1$, $SPC_2$ ... $SPC_N$). In some embodiments, each subgroup may be further divided into a set of levels. These levels may be represented as subgroup levels ($SGL_{ia}$), where 'i' is the subgroup ID, and 'a' is the aim group for that subgroup. $P_{maxi}$ is the maximum power allowed on panel $P_i$. $SG_{maxi}$ is the maximum power of subgroup $SG_i$. T is the power level requested or placed on the receiver from the entire heliostat field, also known as the throttle level.

$$\left(\begin{array}{cccc} SPC1 & SPC2 & \ldots \\ \text{Identity Matrix(size of subgroup count)} & \text{Identity Matrix(size of subgroup count)} & \ldots \\ 1, 1, 1, 1, 1, 1, 1, 1 \ldots & \ldots & \ldots, 1 \end{array}\right) * \left(\begin{array}{c} SGL_{i1} \\ SGL_{i2} \\ \ldots \end{array}\right) \leq \left(\begin{array}{c} P_{maxi} \\ SG_{maxi} \\ T \end{array}\right)$$

The amount of power from each subgroup may be limited to the sum of the power to each aim group over the given subgroup. The power may still be limited on the panels, and the throttle level may still be set to the requested throttle level. By assuming the aim groups are relatively close in the receiver from one subgroup. To satisfy this restriction, the subgroup levels may be given artificial subgroup maxima that are lower than their real maxima. These new subgroup levels have values between 0 and their maximum value $SG_{maxi}$.

$$\left(\begin{array}{cccc} SPC1 & SPC2 & \ldots \\ IdentityMatrix(sizeofsubgroupcount) & IdentityMatrix(sizeofsubgroupcount) & \ldots \\ 1, 1, 1, 1, 1, 1, 1, 1 \ldots & \ldots & \ldots, 1 \end{array}\right) * \left(\begin{array}{c} SGL_{i1} \\ SGL_{i2} \\ \ldots \end{array}\right) \leq \left(\begin{array}{c} P_{maxi} \\ SG_{maxi} * \alpha \\ T \end{array}\right)$$

space, expanding the constraint matrix, and adding new variables, the controller may generalize the LPSP to two or more aim points.

Flux Distribution and Repeatability Generalization

In another embodiment, there may be additional restrictions set by the controller. An LPSP solution may be needed, or desired, that distributes the power as uniformly as possible. "Distributing the power uniformly" may describe a scenario where flux from the heliostats should be distributed evenly on the receiver panels or that power contribution to the receiver should be divided uniformly amongst the multiple heliostat subgroups. Further, the LPSP solution should be consistent if the inputs do not change, and should stay roughly the same if the inputs do not perturb beyond an unacceptable level, such as a selected threshold. The controller may account for these restrictions by repeatedly running an LPSP while varying the inputs. Specifically, the maximum power that each subgroup throttle can deliver may be limited to a maximum power density. The controller may assign a relative value to each LPSP solution that may be based on the largest power level of the subgroups normalized by the peak power that the given subgroup may deliver in ideal conditions. That is, the controller may compare each LPSP solution to every other LPSP solution by the largest normalized subgroup level that was used in the inputs.

The process of comparing the LPSP solutions to find an optimal result may comprise the following steps: solving a first iteration of the LPSP and delivering the solution to the controller. If the throttle level (T) obtained in the solution is less than the requested throttle level, then the first solution is utilized and the process ends. However, if this found throttle level is equal to the requested throttle level, then the controller searches amongst all possible solutions of maximum normalized subgroup levels, $SG_{maxi}$. In some embodiments, there may be an additional restriction to evenly distribute the power delivered to the receiver amongst heliostats throughout the field. For example, LPSP solutions that supply the required power to the receiver from heliostats distributed over multiple subgroups may be preferred over solutions that require 100% of the power to be delivered to the receiver from one subgroup. To satisfy this restriction, the subgroup levels may be given artificial subgroup maxima that are lower than their real maxima. These new subgroup levels have values between 0 and their maximum value $SG_{maxi}$.

The next step in comparing the LPSP solutions is for the controller to perform a binary search of all solutions for every value of a. The lowest of these subgroup maxima (a) that still satisfies the requested throttle level (T) may then be taken as the final solution. The optimization process therefore involves binary searching all solutions to the LPSP for the maximum power delivered to the receiver from as many subgroups with the same normalized power as possible, while still satisfying the required throttle level and complying with restrictions on power limits to each panel. Because in this embodiment the search over all solutions is binary, there may now be one solution to the problem, rather than a single LPSP which may have infinitely many solutions. By effectively providing a linear answer to a nonlinear problem the controller may quickly calculate a solution. In other embodiments, alternate search methods may be used instead of a binary search, for example, a linear walk, a random walk, and/or heuristic optimization.

The LPSP method returns a solution to the controller that evenly distributes the power required amongst the available subgroups to satisfy the throttle level. A more even distribution of power contributions from the heliostat subgroups allows for the minimization of equipment cycling, which may reduce capital and operating costs over the lifetime of the plant by providing a maximum amount of power delivered per equipment cycle. Equipment cycling may comprise at least one of: heliostat movement, drive movement, and thermal transients on the receiver panels.

Additionally, by utilizing the binary search method to select a solution from the set of valid solutions to the LPSP, the number of heliostats to be actuated may be distributed amongst the different field subgroups. This overcomes potential limitations of electrical power distribution to individual heliostats and improves the efficiency of plant operation. As an example, consider that a single subgroup comprising a plurality of heliostats may only draw enough power to actuate one heliostat at a time. If the plant controller requires multiple heliostats in proximity to be actuated, the heliostats in a single group may have to wait for power availability to complete their movement cycle. Distributing the heliostats to be actuated amongst multiple subgroups may reduce the time necessary to satisfy the throttle demand by reducing the likelihood of a heliostats waiting for power availability. Power to the receiver may then be maximized during significant transient periods such as plant startup.

Exemplary Embodiments

A central solar receiver power plant may comprise a throttle with two heliostat subgroups of equal size and a central receiver with two panels. The first heliostat subgroup (subgroup X) may provide 10% of its power to the first panel, and may provide 90% of its power to the second panel. The second heliostat subgroup (subgroup Y) may provide 50% of its power to the first panel, and may provide 50% of its power to the second panel. In this situation, the problem to be solved by the controller may be expressed as follows:

$$\begin{pmatrix} .1 & .5 \\ .9 & .5 \\ 1 & 0 \\ 0 & 1 \\ 1 & 1 \end{pmatrix} \begin{pmatrix} x \\ y \end{pmatrix} \leq \begin{pmatrix} 100 \\ 100 \\ 50 \\ 50 \\ 100 \end{pmatrix}$$

In this example, both panels are each limited to 100 kilowatts (kW) of power, both subgroups may each generate 50 kW of power, and the requested throttle level is 100 kW. The objective function (x+y) may then be maximized by the controller at 100 kW with x and y both being 50 kW. Given the first two rows of the matrix, the panel limits may be honored, the throttle level may be achieved, and the power may be evenly distributed.

Instead of the field limits both being 50 kW, the limits set by the controller may be such that their sum may be higher than the total throttle level. In this situation, the problem may be expressed as follows:

$$\begin{pmatrix} .1 & .5 \\ .9 & .5 \\ 1 & 0 \\ 0 & 1 \\ 1 & 1 \end{pmatrix} \begin{pmatrix} x \\ y \end{pmatrix} \leq \begin{pmatrix} 100 \\ 100 \\ 50 \\ 100 \\ 100 \end{pmatrix}$$

In this example, the controller may generate two or more LPSP solutions. One possible LPSP solution may be x=50 and y=50. Another LPSP solution may be x=0 and y=100. In this particular case, any combination between these two solutions where the two groups still sum to 100 and x does not exceed 50 may be a valid LPSP solution. All of these LPSP solutions may honor the panel limits, and may also achieve the throttle level. They may not, however, always be evenly distributed. Further, the controller may not give a consistent solution, as the LPSP may give only one of many solutions and may give a different one each time it is run.

If the controller runs the LPSP once, and the solution given is x=20 and y=80, then it is known that the ideal solution lies somewhere in between x=50 and y=50 and x=20 and y=80. Given that both of these fields are of the same size, their normalizations may be equal. In this case, the value of the given LPSP solution is 80, assuming a normalization of 1. Even distributions may have a value of 50, i.e., x=50 and y=50, but this may not honor the facet limits. The controller may then perform a binary search in between these two solutions. If the given LPSP solution does not achieve the throttle level, then the final solution may have a higher value. If the given LPSP solution does achieve the throttle level, then it must have an equal or lower value.

In this example, the next iteration of the linear program by the controller may be expressed by the following:

$$\begin{pmatrix} .1 & .5 \\ .9 & .5 \\ 1 & 0 \\ 0 & 1 \\ 1 & 1 \end{pmatrix} \begin{pmatrix} x \\ y \end{pmatrix} \leq \begin{pmatrix} 100 \\ 100 \\ 50 \\ 65 \\ 100 \end{pmatrix}$$

This may then give a result between x=35 and y=65, and x=50 and y=50. This result will have achieved the given throttle level, so the final solution must then have a value between 65 and 50, and accordingly 57.5 will be attempted next. Note, however, that if the LPSP returned is between 40 and 60, the final solution must then have a value between 50 and 60, so 55 will be attempted next. This process may be continued until the difference between the lower and upper solution becomes smaller than some threshold defined by the controller. Once the solution satisfies all four conditions given above, it may be sent out to the subgroup throttles.

Solution Stabilization

The control system, via one or more control processing units (See FIG. 3), may seek to determine the set of output variables which will optimize some criterion, subject to a set of constraints. The optimization criterion, and the constraints, may be represented as a linear program. In such a control system, the criterion for optimization may also be constrained. In these circumstances in particular, but also in other less common circumstances, the optimal solution to the linear program may not be unique. Instead, the space of optimal solutions will occupy a convex shape on a hyperplane in the output space. A solution to this linear program, e.g., using the simplex algorithm, may pick a solution that is a vertex of this convex shape.

If the control system is dynamic, some of the parameters of the linear program may be subject to fluctuations in time. Because the problem is linear, small fluctuations may cause proportionally small shifts in the shape and position of the optimal solution set. If the solution is unique, then this results in desired behavior. However, if the solution is not unique, the set of optimal solutions will be a convex shape. Established linear programming algorithms, such as the simplex algorithm, pick a vertex of the convex shape, and small fluctuations in the input parameters may yield arbitrarily large changes in the output variables, if the algorithm settles to a different vertex. In such a dynamic control problem, there may be significant negative consequences to such large short-term shifts in the output variables.

The disclosed system mitigates these issues by identifying all of the full space of optimal solutions to the linear program, rather than a single vertex. The output control variables may then be chosen from the full space of optimal solutions in such a way that small shifts in the optimal solution space, caused by small shifts in the input parameters, cause proportionately small shifts in the output variables.

The linear program of the current system may be of the form: find the vector X of length M which minimizes X·V subject to the constraint A X≤B, and X≥0, where A is a matrix with M columns and N rows, B is the constraint vector of N elements, and V is the objective function vector of length M. One method of solving this linear program may be to first augment X and A with "slack variables" to convert the problem to one of the form AX=B. The matrix A has M+N columns and N rows. V must also be augmented with zeroes. Because M+N>N, there may be many solutions to the equation. A solution is basic if it is one such that M values in the augmented X are fixed to zero. The N values chosen to be free for the linear program to solve for are called "basic" variables, and the M ones chosen to be zero are called "non-basic" variables. Such a solution is feasible if it satisfies X≥0. Two basic feasible solutions X may be considered adjacent if they differ by exchanging exactly one pair of variables between the basic and non-basic sets. The standard simplex algorithm works by traversing between basic feasible solutions in a direction such that the objective function X·V always improves. The algorithm terminates when no such traversal exists for which the objective function improves.

An addition to the simplex algorithm, upon finding an optimal basic feasible solution, is to check to see if a transition to any of the adjacent basic feasible vertices keeps the objective function the same. If the transition could improve the solution, the current vertex would not be an optimal solution. If the vertex being checked would have a worse objective function, then that vertex would not be in the optimal solution set. Those vertices may be adjacent to other optimal basic feasible vertices. The method may iteratively collect the full set of optimal basic feasible vertices, which define the extent of a convex shape on a hyper-plane of dimension M−1. Any point inside this shape is an optimal solution to the linear program.

The processor may execute a method to choose a point from the convex shape defined above as the output of the problem in such a way that small perturbations to the input variables of the problem will reliably produce small changes to the output. This technique may also be used to stabilize the output of a control system incorporating a linear program. In some embodiments, the centroid of the convex shape may be used as the return variable. In another embodiment, the processor may choose the average position of the vertices. This may be useful for computationally constrained environments. In other embodiments, the processor may allow a tolerance in the objective function gradient to allow for finite-precision floating point math.

Exemplary Embodiments

One exemplary system may comprise a steam generating receiver. Two heat sources may then be available to contribute heat to the system. Each heat source is constrained by the total heat it can contribute, and the receiver is constrained in the total amount of flux that it can absorb. The control problem is to determine the heat output of each source, and seeking to maximize the heat absorbed subject to the stated constraints. In the case where the receiver can absorb at least the sum of the two sources at their maximum contributions, there is a unique solution: that each source is contributing to its maximum amount. In the case where the receiver cannot absorb the full heat from both sources, the simplex algorithm may take as much heat as possible from one source, and, if need be, fill in the rest from the other source.

In instances when the receiver cannot absorb the full heat from either source, the simplex algorithm may tend to pick the source with the higher allowed output, and provide all of the heat from that source. If those allowed outputs fluctuate in time, such that the source that can produce more heat will frequently oscillate, the result of this control may be that each heat source will be turned all the way on and all the way off at nearly arbitrary points. This may lead to shorter equipment lifetime and/or lower operational efficiency. The preferred solution would be to get half the desired flux from each source, and only vary that by the minimum required by changing circumstances. The described algorithm yields this solution.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A system comprising:
a solar thermal receiver having a plurality of panels;
a plurality of heliostats configured to reflect flux from the Sun toward the solar thermal receiver; and
a processor having an addressable memory, the processor configured to:
receive a linear function comprising input parameters of maximizing an amount of heat absorbed by the solar thermal receiver;
receive constraints comprising: a calculated total energy that a heliostat can contribute to the solar thermal receiver, a total amount of flux the solar thermal receiver can absorb, and the total amount of flux a panel of the solar thermal receiver can absorb;
determine all of a full space of optimal solutions to the received linear function based on the input parameters and the constraints, wherein the full space of optimal solutions has a convex shape on a hyperplane;
select a point from in the full space of optimal solutions as a return variable, wherein small perturbations to the amount of heat absorbed by the solar thermal receiver produces small changes to the return variable; and
select a desired set of tracking heliostats that satisfies the received linear function.

2. The system of claim 1 wherein the selected point is a centroid of the convex shape of optimal solutions.

3. The system of claim 1 wherein the selected point is an average position of a set of vertices of the convex shape of optimal solutions.

4. The system of claim 1, wherein the return variable is a throttle level at a solar thermal power plant.

5. The system of claim 1, wherein the solar thermal receiver is a steam generating receiver.

6. A method comprising:
receiving, by a processor having an addressable memory, a linear function comprising input parameters of maximizing an amount of heat absorbed by a solar thermal receiver;
receiving, by the processor, constraints comprising: a calculated total energy that a heliostat can contribute to the solar thermal receiver, a total amount of flux the solar thermal receiver can absorb, and the total amount of flux a panel of the solar thermal receiver can absorb;

determining, by the processor, all of a full space of optimal solutions to the received linear function based on the input parameters and the constraints, wherein the full space of optimal solutions has a convex shape; and selecting, by the processor, a point in the full space of optimal solutions as a return variable, wherein small perturbations to the amount of heat absorbed by the solar thermal receiver produces small changes to the return variable; and selecting, by the processor, a desired set of tracking heliostats that satisfies the received linear function based on stabilizing a throttle at a solar thermal power plant comprising a set of solar thermal receivers with a plurality of panels and a plurality of heliostats configured to reflect flux from the Sun toward the solar thermal receiver.

7. The method of claim 6 wherein the selected point is a centroid of the convex shape of optimal solutions.

8. The method of claim 6 wherein the selected point is an average position of a set of vertices of the convex shape of optimal solutions.

9. The method of claim 6, wherein the solar thermal receiver is a steam generating receiver.

* * * * *